(12) United States Patent
Minami et al.

(10) Patent No.: US 11,048,322 B2
(45) Date of Patent: *Jun. 29, 2021

(54) INFORMATION PROCESSING APPARATUS THAT SAVES POWER IN POSITION ACQUISITION

(71) Applicant: CASIO COMPUTER CO., LTD., Tokyo (JP)

(72) Inventors: Tsuyoshi Minami, Musashimurayama (JP); Kimiyasu Mizuno, Akishima (JP); Hideo Suzuki, Ome (JP); Takashi Suenaga, Tokyo (JP); Keiichi Nomura, Uenohara (JP); Shuhei Uchida, Hamura (JP); Shigeki Kitamura, Iruma (JP); Munetaka Seo, Fussa (JP); Toshiya Sakurai, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/781,130

(22) Filed: Feb. 4, 2020

(65) Prior Publication Data
US 2020/0201421 A1 Jun. 25, 2020

Related U.S. Application Data

(62) Division of application No. 15/864,320, filed on Jan. 8, 2018, now Pat. No. 10,591,982.

(30) Foreign Application Priority Data

Mar. 22, 2017 (JP) .............................. JP2017-055267

(51) Int. Cl.
*G06F 1/32* (2019.01)
*G06F 1/26* (2006.01)
(Continued)

(52) U.S. Cl.
CPC ......... *G06F 1/3287* (2013.01); *G01C 21/005* (2013.01); *G06F 1/163* (2013.01);
(Continued)

(58) Field of Classification Search
None
See application file for complete search history.

(56) References Cited

U.S. PATENT DOCUMENTS 7,593,755 B2   9/2009 Colando et al.
8,874,176 B2   10/2014 Yato
(Continued)

FOREIGN PATENT DOCUMENTS

JP   2001027681 A   1/2001
JP   2001074826 A   3/2001
(Continued)

OTHER PUBLICATIONS

Japanese Office Action (and English language translation thereof) dated Apr. 28, 2020 issued in Japanese Application No. 2017-055267.
(Continued)

*Primary Examiner* — Nitin C Patel
(74) *Attorney, Agent, or Firm* — Holtz, Holtz & Volek PC

(57) ABSTRACT

An information processing apparatus includes a first processor, a second processor, and a positioning processor. The second processor consumes a reduced amount of power compared to the first processor during an operation. The positioning processor receives radio waves from positioning satellites and converts the radio waves into positioning data. The second processor controls the positioning processor. The second processor stores the positioning data received from the positioning processor. The second processor trans-
(Continued)

fers the stored positioning data to the first processor at a timing determined in accordance with an operating condition of the first processor.

4 Claims, 9 Drawing Sheets

(51) Int. Cl.
G06F 1/3287 (2019.01)
G06F 1/3234 (2019.01)
G06F 1/3215 (2019.01)
G06F 1/16 (2006.01)
G06F 1/3293 (2019.01)
G01C 21/00 (2006.01)

(52) U.S. Cl.
CPC .......... *G06F 1/1694* (2013.01); *G06F 1/3215* (2013.01); *G06F 1/3265* (2013.01); *G06F 1/3293* (2013.01)

(56) References Cited

U.S. PATENT DOCUMENTS

| | | |
|---|---|---|
| 9,122,482 B2 | 9/2015 | Inoue |
| 9,128,180 B2 | 9/2015 | Saha et al. |
| 2009/0054075 A1 | 2/2009 | Boejer et al. |
| 2009/0058713 A1 | 3/2009 | Okunishi et al. |
| 2010/0151882 A1 | 6/2010 | Gillies et al. |
| 2011/0102257 A1 | 5/2011 | Spyropoulos et al. |
| 2013/0244686 A1 | 9/2013 | Saha et al. |
| 2016/0025863 A1 | 1/2016 | Lau et al. |

FOREIGN PATENT DOCUMENTS

| | | |
|---|---|---|
| JP | 2006101505 A | 4/2006 |
| JP | 2012108001 A | 6/2012 |
| JP | 2012145465 A | 8/2012 |
| JP | 2013010257 A | 1/2013 |
| JP | 2015109550 A | 6/2015 |

OTHER PUBLICATIONS

Japanese Office Action (and English language translation thereof) dated Feb. 4, 2019 issued in counterpart Japanese Application No. 2017-055267.

INFORMATION PROCESSING APPARATUS THAT SAVES POWER IN POSITION ACQUISITION

CROSS-REFERENCE TO RELATED APPLICATIONS

This application is a Divisional Application of U.S. application Ser. No. 15/864,320, filed Jan. 8, 2018, now U.S. Pat. No. 10,591,982 issued on Mar. 17, 2020, which is based upon and claims the benefit of priority from Japanese Patent Application No. 2017-055267 filed on Mar. 22, 2017 the entire contents of which are incorporated herein by reference.

BACKGROUND OF THE INVENTION

1. Field of the Invention

The present invention relates to an information processing apparatus utilizing positioning satellites.

2. Description of the Related Art

Information processing apparatuses including a display have been known that process various information items and cause the processed information items to appear on displays (for example, refer to Japanese Unexamined Patent Application Publication No. 2006-101505).

Many information processing apparatuses include satellite-radio-wave reception modules to receive radio waves from satellites, carry out positioning operations to calculate the current position, and process the results of the positioning for various purposes.

SUMMARY OF THE INVENTION

According to an aspect of the present invention an information processing apparatus includes:
a first processor;
a second processor consuming a reduced amount of power compared to the first processor during an operation; and
a positioning processor receiving radio waves from positioning satellites and converting the radio waves into positioning data, wherein
the second processor controls the positioning processor, and
the second processor stores the positioning data received from the positioning processor, and
the second processor transfers the stored positioning data to the first processor at a timing determined in accordance with an operating condition of the first processor.

DETAILED DESCRIPTION OF THE PREFERRED EMBODIMENTS

A smart watch 100 exemplifying an information processing apparatus according to an embodiment of the present invention will now be described.

Figure 1A:
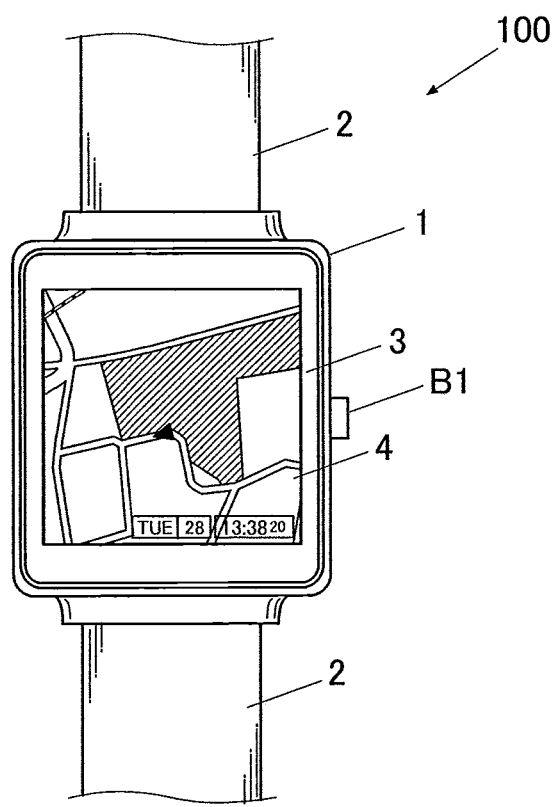
FIG. 1A is a front view of a smart watch according to an embodiment.
Figure 1B:
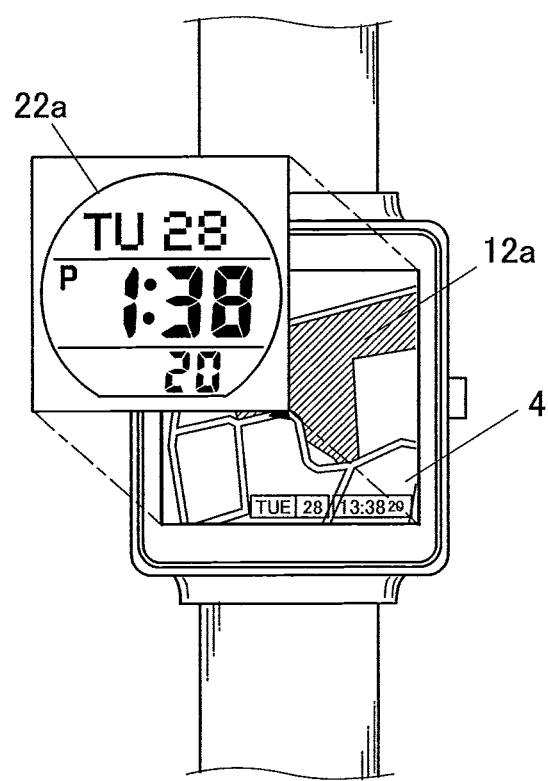
FIG. 1B is a front view of the smart watch according to an embodiment.

FIGS. 1A and 1B are front views of the smart watch 100 according to this embodiment.

With reference to FIG. 1A, the smart watch 100 is an information processing apparatus worn around an arm of a user and includes a body 1 and a band 2. The body 1 of the smart watch 100 includes a frame 3, a display screen 4, and a push-button switch B1.

The frame 3 supports the display screen 4 such that the display screen 4 is exposed from one face of the frame 3 and accommodates functional components involved in various operations described below.

The display screen 4 includes two stacked displays. With reference to FIG. 1B, a display screen 22a of a second display 22 (see FIG. 2) is disposed over a display screen 12a of a first display 12 (see FIG. 2). FIG. 1A illustrates an image that appears on the first display 12 and passes through the display screen 22a of the second display 22.

A touch sensor or touch panel (not shown) is disposed on the upper portion of the second display 22 to receive user operations. A push-button switch B1 is disposed on a side face of the frame 3 and receives user operations, in addition to the touch sensor.

The first display 12 includes a color dot-matrix liquid-crystal display screen. The first display 12 switches among various displays associated with various functions in accordance with user input operations and various program operations or displays an array of these displays.

The second display 22 is, for example, a segmented bitonal liquid crystal display and includes a screen that displays a simple image indicating the time with power consumption lower than that of the first display 12. Alternatively, the display screen 22a of the second display 22 may be a memory-in-pixel (MIP) liquid crystal display screen or a polymer network (PN) liquid crystal display screen. A predetermined voltage applied to the display screen 22a of the second display 22 turns off the image display of the display screen 22a and causes the display screen 22a to transmit the image of the first display 12.

Figure 2:
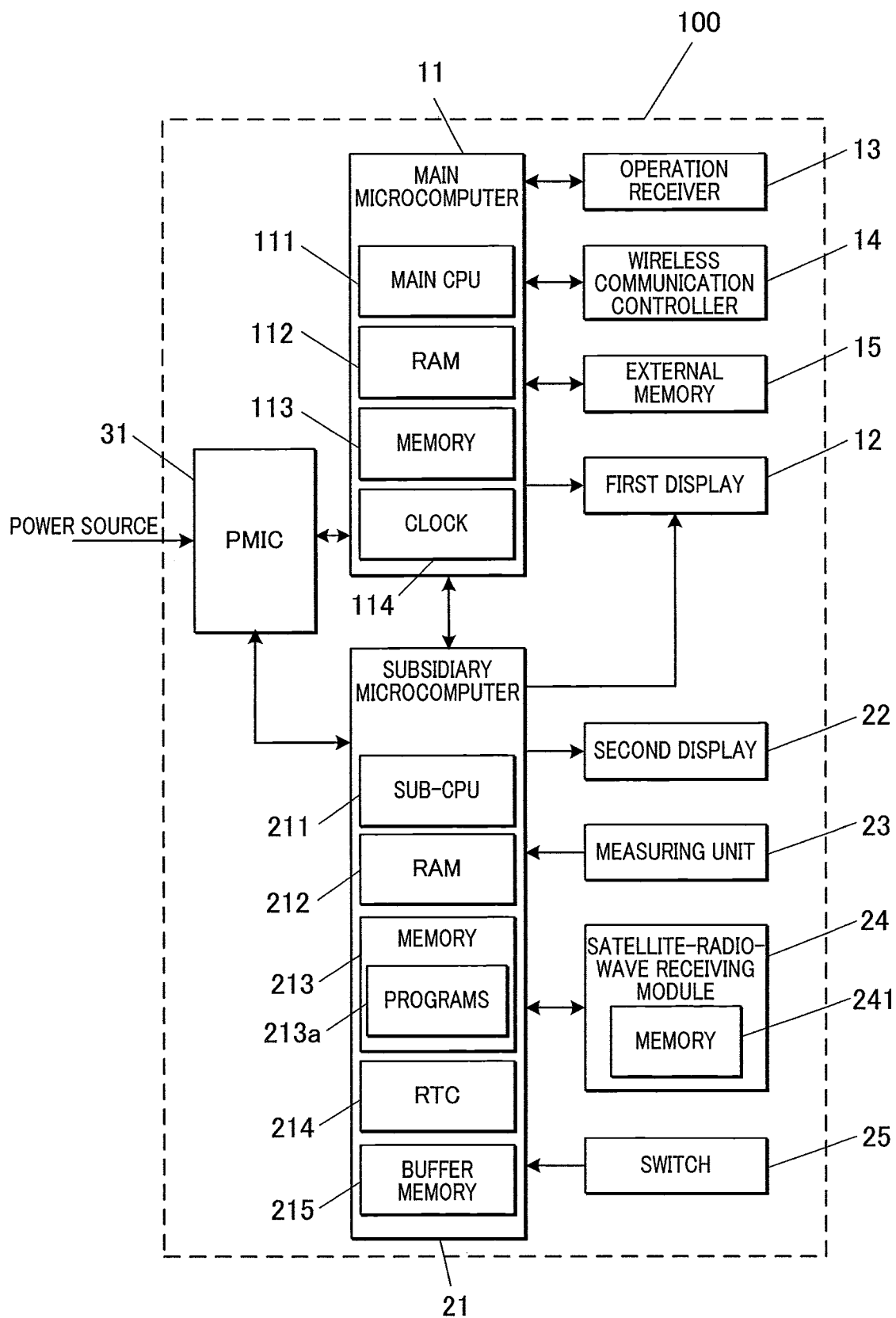
FIG. 2 is a block diagram illustrating the functional configuration of the smart watch.

FIG. 2 is a block diagram illustrating the functional configuration of the smart watch 100 according to this embodiment.

The smart watch 100 incudes a main microcomputer 11 or first processor, a first display 12, an operation receiver 13, a wireless communication controller 14, an external memory 15 or map-information memory unit, a subsidiary microcomputer 21 or second processor, a second display 22, a measuring unit 23, a satellite-radio-wave receiving module 24 or positioning processor, a switch 25, and a power management IC (PMIC) 31.

The main microcomputer 11, which is a main processor, includes a main CPU 111, a RAM 112, a memory 113, and a clock 114 (first clock). The main microcomputer 11 is supplied with electrical power from a power supply via the PMIC 31 and controls the operation of various components, including the first display 12, the operation receiver 13, the wireless communication controller 14, and the external memory 15.

The main CPU 111 carries out various calculation processes and comprehensively controls the overall operation of the smart watch 100 in a normal operational state. The main CPU 111 receives the calculated data from the satellite-radio-wave receiving module 24 and the measuring unit 23 via the subsidiary microcomputer 21 and carries out information processing. The processing includes preparation of various display data items, calculation of values such as moving rate, moving acceleration, and moving direction, statistical processing of determining the integration, average, and variation of the calculated values, and calculation of various parameters, such as caloric consumption, derived from the data items. The main CPU 111 may be paused automatically or in response to a predetermined input operation when the operation of the main CPU 111 is not required.

The RAM 112 provides a work memory space for the main CPU 111 and stores temporary data.

The memory 113 is a non-volatile memory, such as a flash memory, that stores various control programs including various application programs (apps) and data items to be executed by the main CPU 111. The data stored in the memory 113 includes application programs using the results of the positioning acquired by the satellite-radio-wave receiving module 24, and moving trajectory data or log data based on the results of the positioning acquired by the satellite-radio-wave receiving module 24 in the form of time series data in response to instructions by the application programs. Examples of the application programs include a positional-information acquisition application program and a navigation application program that routinely acquires the current position and outdoor-activity logger application programs, such as an activity tracker application program, a running tracker application program, a cycling tracker application program, and a climbing tracker application program.

The clock 114 counts the current date and time under the control of the main CPU 111. The clock 114 includes a counter and counts the time and date in accordance with the operational clock frequency of the main microcomputer 11 with a precision higher than that of the real time clock (RTC) 214 described below.

The first display 12 displays an image mainly in response to a control operation by the main microcomputer 11 (main CPU 111). The display is turned off while the main microcomputer 11 is in a dormant state. Alternatively, limited content may be displayed under the control of the subsidiary microcomputer 21 (sub-CPU 211).

The operation receiver 13 includes the touch sensor mentioned above. The operation receiver 13 receives an input operation from an external unit or user, converts the input operation to an electrical signal, and sends this electrical signal to the main CPU 111. If the main CPU 111 is in a standby state when the touch sensor receives an input operation, the electrical signal functions as an operation resume signal to resume the operation of the main CPU 111.

The wireless communication controller 14 establishes wireless communication with external electronic devices. The wireless communication may be carried out in accordance with any standard, for example, a close-range wireless communication standard, such as Bluetooth (trademark), or a wireless LAN standard, such as IEEE802.11. The main microcomputer 11 (main CPU 111) can acquire necessary information, programs, and update data from external units via the wireless communication controller 14. Examples of external electronic devices that establish wireless communication with the wireless communication controller 14 include a smart phone, a mobile phone, a tablet, and a personal digital assistant (PDA).

The external memory 15 is a large non-volatile storage unit storing map data referred to for navigation and map display. The external memory 15 may be disposed in the smart watch 100. Alternatively, the external memory 15 may be a small detachable portable storage medium, such as a flash memory. The map data may be preliminarily provided on a storage medium. Alternatively, via Wi-Fi, the map data may be preliminarily updated by the user or updated in response to a variation in the results of the positioning such that the updated map data can be deleted from the storage medium.

The subsidiary microcomputer 21 includes a sub-CPU 211 or second processor, a RAM 212, a memory 213, a real time clock (RTC) 214 (second clock), and a buffer memory 215 or temporary memory. The subsidiary microcomputer 21 is supplied with electrical power from a power source via the PMIC 31 for operation. The subsidiary microcomputer 21 controls the operation of the second display 22, the measuring unit 23, and the satellite-radio-wave receiving module 24, and the transmission and reception of data to and from the main microcomputer 11. The power consumption during normal operation and the maximum power consumption of the subsidiary microcomputer 21 are smaller than those of the main microcomputer 11, respectively. Power consumption during normal operation and the maximum power consumption of the subsidiary microcomputer 21 may be based mainly on the thermal design power (TDP) of the CPU or the TDP in consideration of the influence of the size of the RAM and the number of RAMs provided. That is, the subsidiary microcomputer 21 is a subsidiary processor for carrying out continuous operations with relatively low power consumption.

The sub-CPU 211 carries out various calculation processes to comprehensively control the operation of the subsidiary microcomputer 21. The power consumption (TDP) of the sub-CPU 211 lower than that of the main CPU 111 allows the sub-CPU 211 to have lower performance than the main CPU 11. In principle, the sub-CPU 211 maintains a minimal operation unless there is a shortage in power from the PMIC 31. If the minimal operation is periodically carried out at a predetermined time interval, the sub-CPU 211 may enter a standby state during periods other than the predetermined interval.

The RAM 212 provides a work memory area for the sub-CPU 211 and stores temporary data. The RAM 212 stores data while the PMIC 31 continues to feed power even if the operation of the sub-CPU 211 is intermittent, as described above.

The memory 213 is a non-volatile memory, such as a flash memory, that stores various control programs including various application programs and data items to be executed by the sub-CPU 211. The programs 213a stored in the memory 213 includes control programs executed by the subsidiary microcomputer 21, such as a program for controlling the operation of the measuring unit 23 and a program for controlling the positioning operation of the satelliteradio-wave receiving module 24. The memory 213 stores firmware that is a program for operational control by the satellite-radio-wave receiving module 24.

The RTC 214 is a traditional RTC that counts time. The RTC 214 counts time with a precision lower than that of the clock 114 of the main microcomputer 11 and power consumption lower than that of the clock 114. The RTC 214 constantly counts time even while the main microcomputer 11 is turned off and the subsidiary microcomputer 21 is in a standby mode, as described above.

The buffer memory 215 is a volatile memory, such as a DRAM, that temporarily stores the results of the positioning or positioning data acquired by the satellite-radio-wave receiving module 24. The results of the positioning acquired by the satellite-radio-wave receiving module 24 are temporarily stored in the buffer memory 215 and then transferred to the main microcomputer 11 at an appropriate timing.

The second display 22, which consumes reduced amounts of power compared to the first display 12, as described above, displays time. If the display screen includes an MIP liquid crystal screen, the second display 22 can lower the update frequency of the displayed content under the control of the sub-CPU 211.

The measuring unit 23 includes a sensor that measures physical quantities indicating the kinetic state of the smart watch 100. The measuring unit 23 includes an acceleration sensor in this embodiment. The measuring unit 23 may further include a direction sensor or geomagnetic sensor and/or a barometer or altimeter. The measuring unit 23 further includes a tilt sensor that detects a predetermined orientation of the smart watch 100. In this embodiment, the measuring unit 23 detects the tilt of the smart watch 100 when the smart watch 100 is in a predetermined position, specifically, positioned such that the screen of the smart watch 100 is in front of the eyes of the user for viewing by the user.

The satellite-radio-wave receiving module 24 tracks, receives, and demodulates radio waves from GNSS satellites, which are positioning satellites of the global navigation satellite system (GNSS), such as the GPS satellites of the global positioning system (GPS), to acquire time and positional information. The satellite-radio-wave receiving module 24 includes an antenna (not shown) and operates under the control of the subsidiary microcomputer 21 (sub-CPU 211). The satellite-radio-wave receiving module 24 receives radio waves in the L1 band (1.57542 GHz for GPS satellites) and subjects the radio waves to inverse spectral diffusion to decipher navigational messages. The satellite-radio-wave receiving module 24 carries out positioning on the basis of the resulting navigational messages. The acquired date, time, and current position are output in a predetermined format.

The satellite-radio-wave receiving module 24 includes a memory 241 for storing temporary data required for operation. The memory 241 is a volatile memory that stores an execution control program (firmware) required for a positioning operation, information on the format of the navigational messages from the positioning satellites, and information (ephemeris and almanac data) on orbits from the positioning satellites. The memory 241 can continue operation even after shut-down of the receiver of the satellite-radio-wave receiving module 24. After restart of the operation of the memory 241, at least some of the information items including the firmware are retrieved from the memory 213 of the subsidiary microcomputer 21. The satellite-radio-wave receiving module 24 tracks radio waves from a predetermined number of the positioning satellites required for positioning, acquires ephemeris data from the positioning satellites, and constantly calculates the current positions. The current positions may be calculated at any time interval, for example, at an interval of one second in this embodiment.

The switch 25 receives a predetermined user operation to restart the main microcomputer 11 when the main microcomputer 11 is in a dormant mode. The switch 25 may be a dedicated switch or integrated with the push-button switch B1.

The PMIC 31 controls the power supply to the main microcomputer 11 and the subsidiary microcomputer 21. The PMIC 31 includes, for example, a selector switch for switching whether or not power is supplied to the main microcomputer 11 and the subsidiary microcomputer 21 and a DC/DC converter that adjusts the output voltage. The PMIC 31 feeds appropriate electrical power to the main microcomputer 11 and the subsidiary microcomputer 21 during operation.

The operational control of the smart watch 100 according to this embodiment will now be described.

As described above, the smart watch 100 includes the main microcomputer 11 that controls the display operation of the first display 12 and carries out information processing, and the subsidiary microcomputer 21 that controls operation of the second display 22, the measuring unit 23, and the satellite-radio-wave receiving module 24. The display operation of the first display 12 can be turned off when display is unnecessary. While the first display 12 is turned off, the second display 22 displays at least the current time (hour and minute).

The main microcomputer 11 can switch between an operational mode and a dormant mode by turning on and off the main CPU 111. In the dormant mode, the first display 12 is turned off when the main CPU 111 is shut down. The dormant mode may be a standby mode in which the RAM 112 continues to store information and the main microcomputer 11 quickly resumes normal operation when the main CPU 111 restarts. Alternatively, the dormant mode may be a shut-down mode in which the RAM 112 is completely shut down, or a sleep mode in which the information stored in the RAM 112 is transferred to the memory 113 and the RAM 112 is temporarily shut down. The dormant mode of the main microcomputer 11 may be a shut-down and/or a sleep mode, besides the standby mode. Even while the main microcomputer 11 is in the dormant mode, the main microcomputer 11 temporarily resumes operation at a predetermined maintenance operation interval, for example, every 10 minutes, to execute a predetermined process or maintenance operation.

The main microcomputer 11 may be restarted at any time. For example, in this embodiment, the main microcomputer 11 automatically restarts upon detection of a contact operation of the touch sensor of the operation receiver 13 or restarts in response to a start-up signal from the subsidiary microcomputer 21 sent when the tilt sensor of the measuring unit 23 detects the tilt described above.

The subsidiary microcomputer 21 (sub-CPU 211) acquires information on the on/off state of the main CPU 111 and the first display 12 as needed, and carries out operational control in accordance with the operational state of the main CPU 111 and the first display 12.

Figure 3:
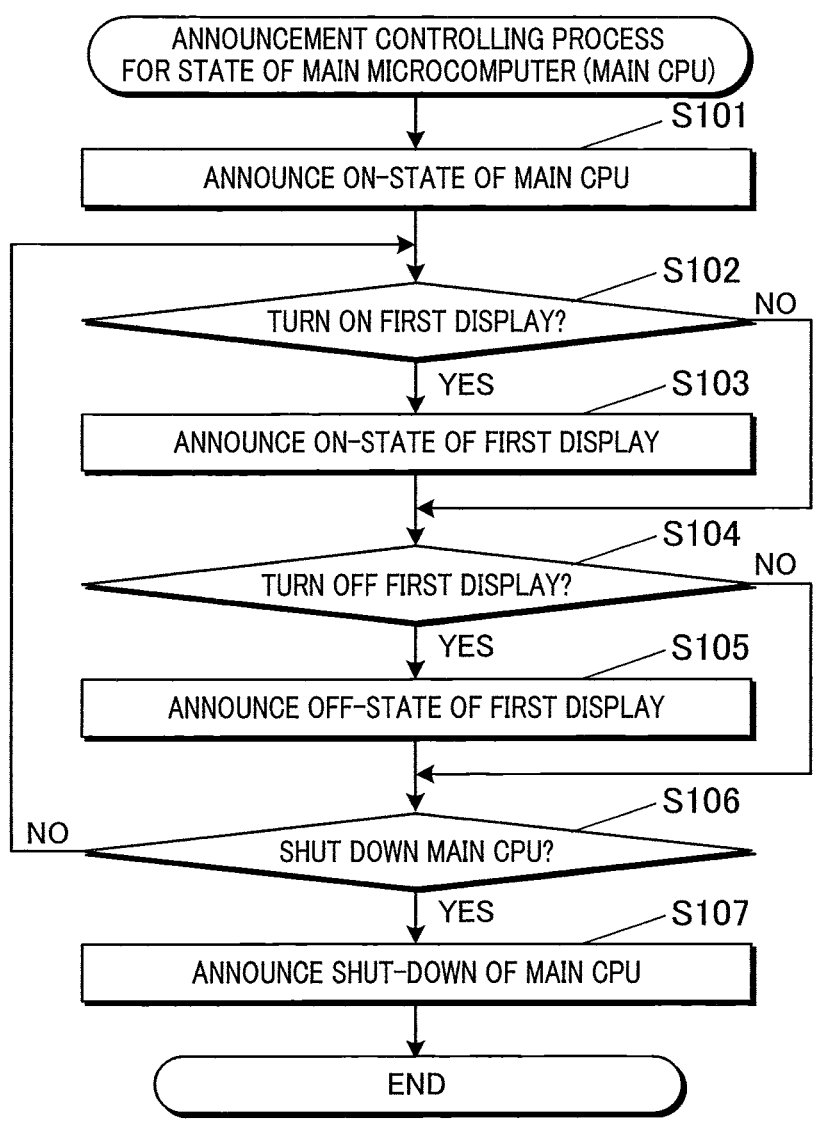
FIG. 3 is a flow chart illustrating a control process executed by a main microcomputer for announcement of the state of the main microcomputer.

FIG. 3 is a flow chart illustrating a control process executed by the main CPU 111 of the main microcomputer 11 for announcement of the state of the main microcomputer 11.

The control process for announcement of the state of the main microcomputer 11 continues from start or restart of the main CPU 111 to shut-down of the main CPU 111. After start of the control process for announcement of the state of the main microcomputer 11, the main CPU 111 sends a notification of the ON state of the main CPU 111 to the subsidiary microcomputer 21 (step S101).

The main CPU 111 determines whether the display operation of the first display 12 is turned on (step S102). If the first display 12 is turned on ("YES" in step S102), the main CPU 111 notifies the subsidiary microcomputer 21 about the ON state of the first display 12 (step S103). The process then goes to step S104. If the first display 12 is not turned on ("NO" in step S102), the process goes to step S104.

In step S104, the main CPU 111 determines whether the display operation of the first display 12 is turned off (step S104). If the first display 12 is turned off ("YES" in step S104), the main CPU 111 notifies the subsidiary microcomputer 21 about the OFF state of the first display 12 (step S105). The process then goes to step S106. If the first display 12 is not turned off ("NO" in step S104), the process goes to step S106.

In step S106, the main CPU 111 determines whether to shut down the main CPU 111 (step S106). If the main CPU 111 is not to be shut down ("NO" in step S106), the process goes to step S102. If the main CPU 111 is to be shut down ("YES" in step S106), the main CPU 111 notifies the subsidiary microcomputer 21 about shut down of the main CPU 111 (step S107). The main CPU 111 then ends the control process for announcement of the state of the main microcomputer 11.

The positioning operation of the smart watch 100 according to this embodiment will now be explained.

In the smart watch 100, the satellite-radio-wave receiving module 24 constantly carries out positioning operations at a predetermined time interval in response to a request from a positional-information acquisition application program resident in the main microcomputer 11, to record the history of the moving of the current positions or the moving trajectory. The recorded moving trajectory can be displayed on a map on the first display 12. The moving history is acquired through constant positioning operations in response to a request for start of positioning sent from the main microcomputer 11 to the subsidiary microcomputer 21, regardless of the operating conditions of the main microcomputer 11, i.e., the operational/dormant mode, the on/off state of the display operation of the first display 12, the on/off state of display of a position by the positional-information acquisition application program during the display operation, and the on/off state of concurrent operation of other application programs by the main microcomputer 11.

The results of the positioning by the satellite-radio-wave receiving module 24 are sent to the subsidiary microcomputer 21 and temporarily stored in the buffer memory 215. The temporarily stored results of the positioning are transferred to the main microcomputer 11 at an appropriate timing determined in accordance with the operating conditions of the main microcomputer 11, such as whether the result is transferrable or the frequency of transfer if the result can be transferred. The results are then processed and displayed at the main microcomputer 11.

Figure 4:
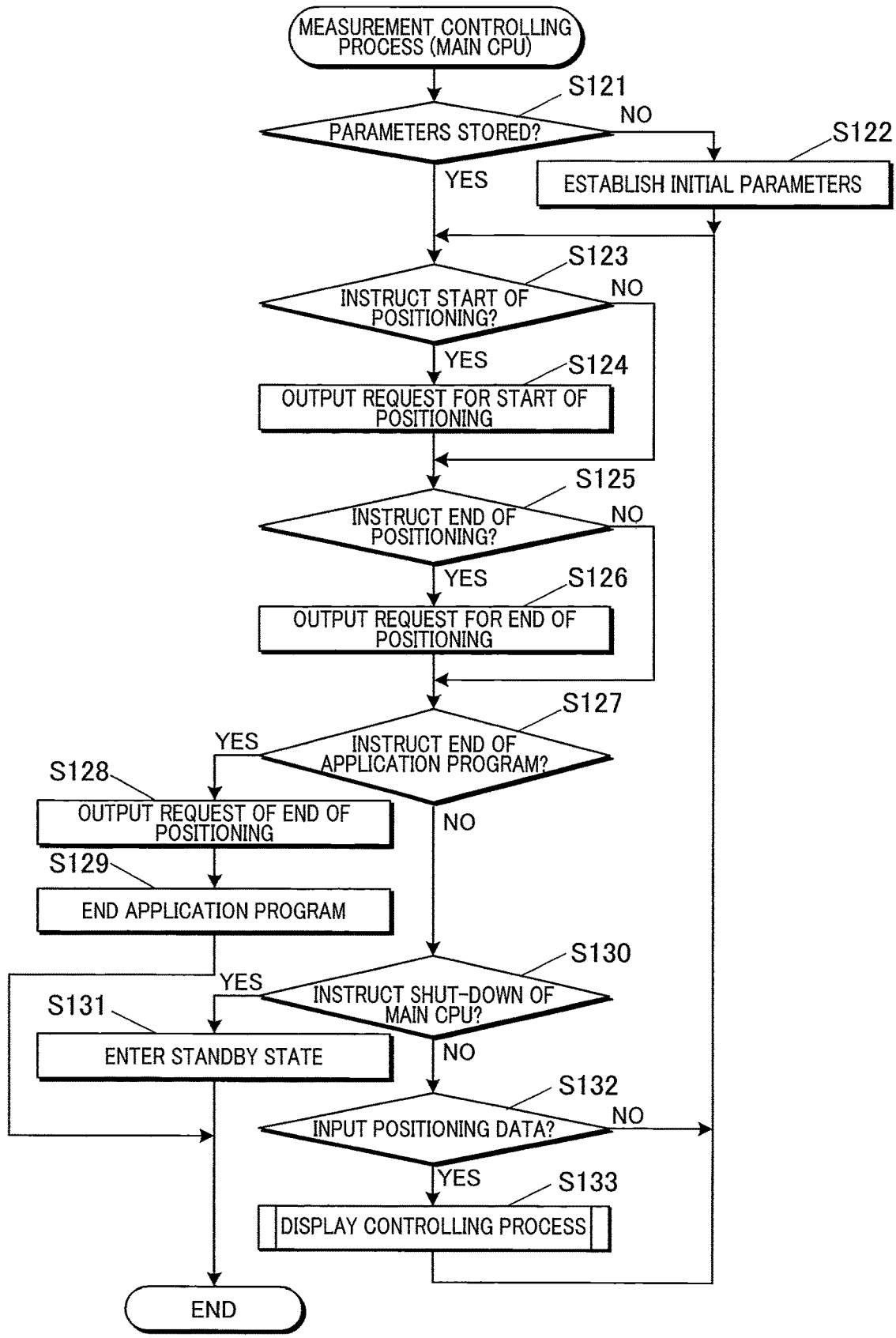
FIG. 4 is a flow chart illustrating a control process for a measurement controlling process executed by the main microcomputer.

FIG. 4 is a flow chart illustrating a control process executed by the main CPU 111 for a measurement controlling process executed by the main microcomputer 11 of the smart watch 100 according to this embodiment. The measurement controlling process starts upon reception of an explicit instruction for starting operation to the operation receiver 13 and at the initial start-up of the main CPU 111 unless the resident setting of the relevant application program is cancelled. During shut-down of the main CPU 111, the measurement controlling process is interrupted after parameters are stored and the subsidiary microcomputer 21 continues to carry out operational control. When the main CPU 111 restarts, the measurement controlling process is resumed.

After start of the measurement controlling process, the main CPU 111 determines whether parameters are stored in the RAM 112 (step S121). These parameters are those stored before shut-down of the main CPU 111. If such parameters are stored, they are used in the measurement controlling process. If parameters are stored ("YES" in step S121), the process goes to step S123. If parameters are not stored ("NO" in step S121), the main CPU 111 reads and establishes initial parameters from the memory 113 (step S122). The initial parameters include an instruction for starting positioning. The process then goes to step S123.

In step S123, the main CPU 111 determines whether the instruction for starting positioning is received (step S123). If the instruction is received ("YES" in step S123), the main CPU 111 sends a request for starting positioning to the subsidiary microcomputer 21 (step S124). The process then goes to step S125. If the instruction is not received or if the positioning operation is already carried out ("NO" in step S123), the process goes to step S125.

In step S125, the main CPU 111 determines whether an instruction for ending positioning is received (step S125). The instruction for ending positioning does not end the measurement controlling process, which is under the control of a resident application program, and only causes a temporary shut-down, such as in an airplane mode selected when boarding an airplane. If the instruction for ending positioning is received ("YES" in step S125), the main CPU 111 sends a request for ending positioning to the subsidiary microcomputer 21 (step S126). The process then goes to step S127. If the instruction for ending positioning is not received or if the positioning operation is already ended ("NO" in step S125), the process goes to step S127.

In step S127, the main CPU 111 determines whether an instruction for ending the resident application program involving measurement control is received (step S127). If the instruction for ending the application program is received ("YES" in step S127), the main CPU 111 sends a request for ending positioning to the subsidiary microcomputer 21 (step S128). The main CPU 111 carries out the process of ending the application program (step S129). This process includes acquisition of the positional information remaining in the buffer memory 215 of the subsidiary microcomputer 21 and carrying out necessary processing. The main CPU 111 then ends the measurement controlling process.

If the instruction for ending the application program is not received ("NO" in step S127), the main CPU 111 determines whether an instruction for shutting down the main CPU 111 or an instruction for entering a dormant or standby mode is received (step S130). If the instruction for shutting down the main CPU 111 is received ("YES" in step S130), the main CPU 111 carries out a process that causes the main microcomputer 11 to enter the standby mode (step S131). This process terminates transmission of data to and from the subsidiary microcomputer 21 and terminates the processing of positioning data by the main microcomputer 11. The main CPU 111 then ends the measurement controlling process.

If the instruction for shutting down the main CPU 111 is not detected ("NO" in step S130), the main CPU 111 checks for input of positioning data to the subsidiary microcomputer 21 (step S132). If the data is input ("YES" in step S132), the main CPU 111 invokes the display controlling process described below (step S133). The process then goes to step S123. If the positioning data is not input ("NO" in step S132), the process goes to step S123.

Display of the current positional information on the first display 12 will now be explained.

When the first display 12 of the smart watch 100 according to this embodiment is on, the first display 12 can display a map image of an area including the recent current position overlapped with a moving history of the positions in the map image.

Figure 5:
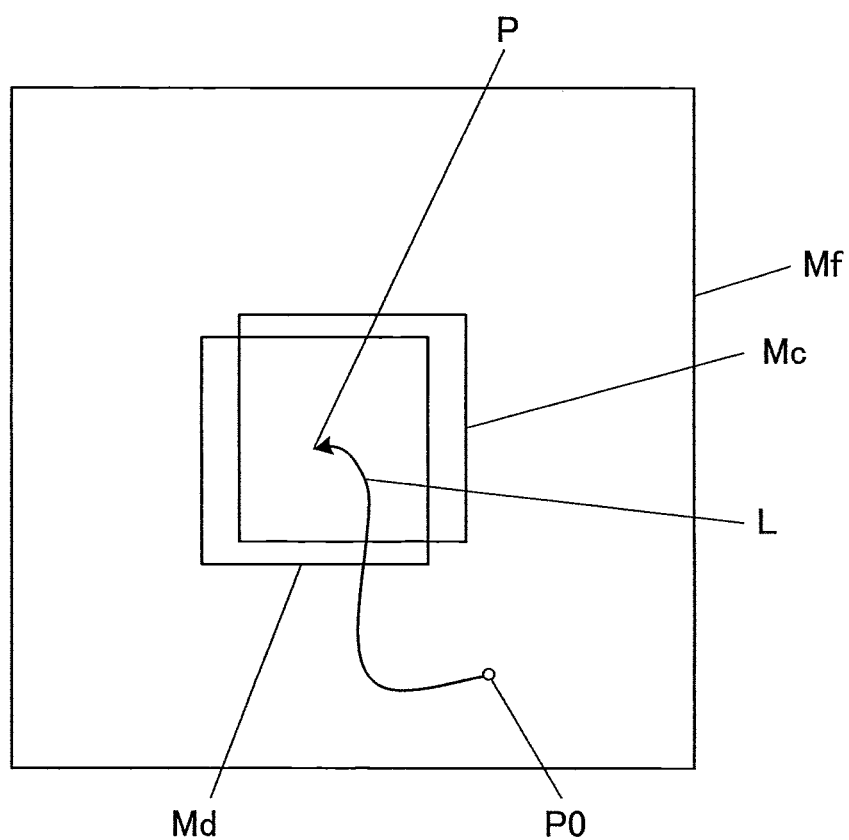
FIG. 5 illustrates the area of generation and display of an output image in the smart watch.

FIG. 5 illustrates the area of generation and display of an output image in the smart watch 100.

The smart watch 100 generates display image data on a map image and a trajectory image overlaid thereon every time the recent current position is acquired. The map image appears in an image formation area Mf that contains a central area Mc containing the recent current position P, where the image formation area Mf is larger than the central area Mc. The trajectory image illustrates a trajectory L of the moving current position from the origin P0 of the positioning to the recent current position P. The map data for generation of the map image is retrieved from the external memory 15. In the actual display process, a display area Md with the recent current position P in the center is determined, an image having the display area Md is trimmed from the generated image data, and the trimmed image is displayed on the screen.

In detail, the image formation area Mf is not updated while the recent current position P resides in the central area Mc, and the display area Md is modified every time the recent current position P moves. The display area Md is positioned such that the top always corresponds to north. Alternatively, the top of the display area Md may always correspond to the traveling direction. The central area Mc and the display area Md may have different sizes. To update the image formation area Mf, the map data within the image formation area Mf is used with no modification, and map data to be newly incorporated into the image formation area Mf is newly retrieved from the external memory 15 and is substituted for the map data deviated from the image formation area Mf.

The image of the trajectory L may include lines connecting the points. Alternatively, the image may include only the points. In the case where the moving rate is high or no information other than the current position is required, the display area Md may include only the recent current position P. The recent current position P may be indicated by an arrow representing the traveling direction from the previously calculated current positions. Alternatively, the recent current position P may be indicated by a simple mark.

The trajectory image on the map image appearing on the screen of the smart watch 100 can be temporarily hidden. Thus, the smart watch 100 may separately generate the map image and the trajectory image and overlay the trajectory image on the map image, or may prepare both image data on a map image including the trajectory and image data on a map image not including the trajectory and switch to the display of the map image corresponding to the input operation at the operation receiver 13.

Figure 6:
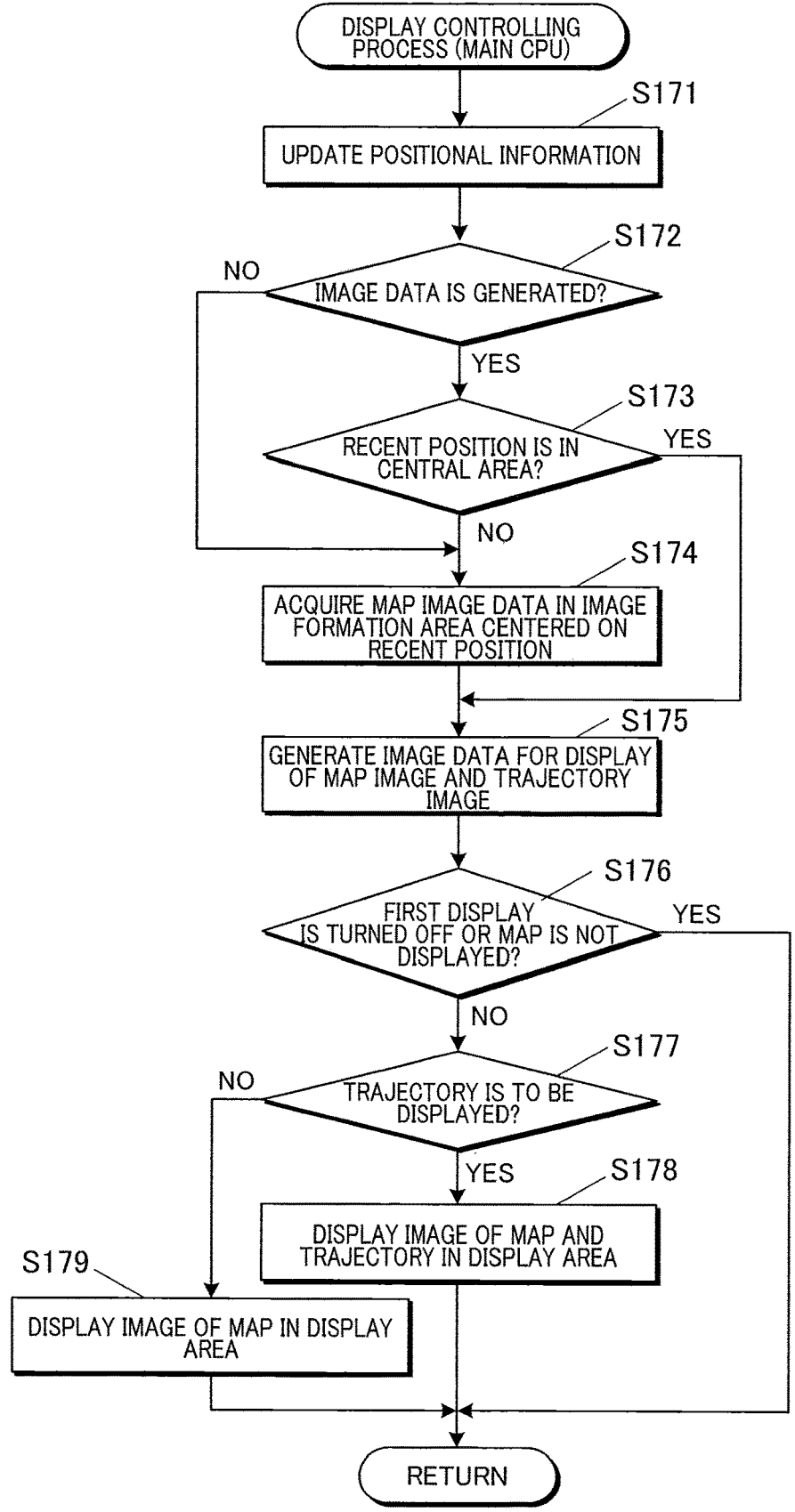
FIG. 6 is a flow chart illustrating a control process for a display controlling process to be invoked in the measurement controlling process.

FIG. 6 is a flow chart illustrating a control process for a display controlling process executed by the main CPU 111 and to be invoked in the measurement controlling process.

After invocation of the display controlling process, the main CPU 111 updates the positional information (trajectory data and data on the recent current position) on the basis of the observed positioning data (step S171). The main CPU 111 checks for generation of image data for display (step S172). If no image data is generated, for example, in the initial display controlling process ("NO" in step S172), the process goes to step S174.

If image data is generated ("YES" in step S172), the main CPU 111 determines whether the recent current position P resides in the central area Mc (step S173). If the recent current position P resides in the central area Mc ("YES" in step S173), the process goes to step S175. If the recent current position P does not reside in the central area Mc ("NO" in step S173), the process goes to step S174.

In step S174, the main CPU 111 retrieves the map data on the image formation area Mf centered on the recent current position P from the external memory 15 (step S174). The process then goes to step S175.

In step S175, the main CPU 111 generates the map image data on the image formation area Mf and the image data on the trajectory L in the image formation area Mf such that trajectory L can be overlaid on the map image (step S175). The main CPU 111 determines whether the display operation of the first display 12 is turned off or whether no map image appears on the first display 12 (step S176). In either case ("YES" in step S176), the main CPU 111 ends the display controlling process and resumes the measurement controlling process.

If the first display 12 is not turned off, i.e., turned on, and a map image appears on the display screen 12*a* ("NO" in step S176), the main CPU 111 determines whether the trajectory is to be displayed (step S177). If the trajectory is to be displayed ("YES" in step S177), the main CPU 111 causes an overlaid image of the map image data and the trajectory image data to appear in the display area Md on the display screen 12*a* of the first display 12 (step S178). The main CPU 111 then ends the display controlling process and resumes the measurement controlling process.

If the trajectory is not to be displayed ("NO" in step S177), the main CPU 111 causes the map image data to appear in the display area Md on the display screen 12*a* of the first display 12 (step S179). The main CPU 111 then ends the display controlling process and resumes the measurement controlling process.

Figure 7:
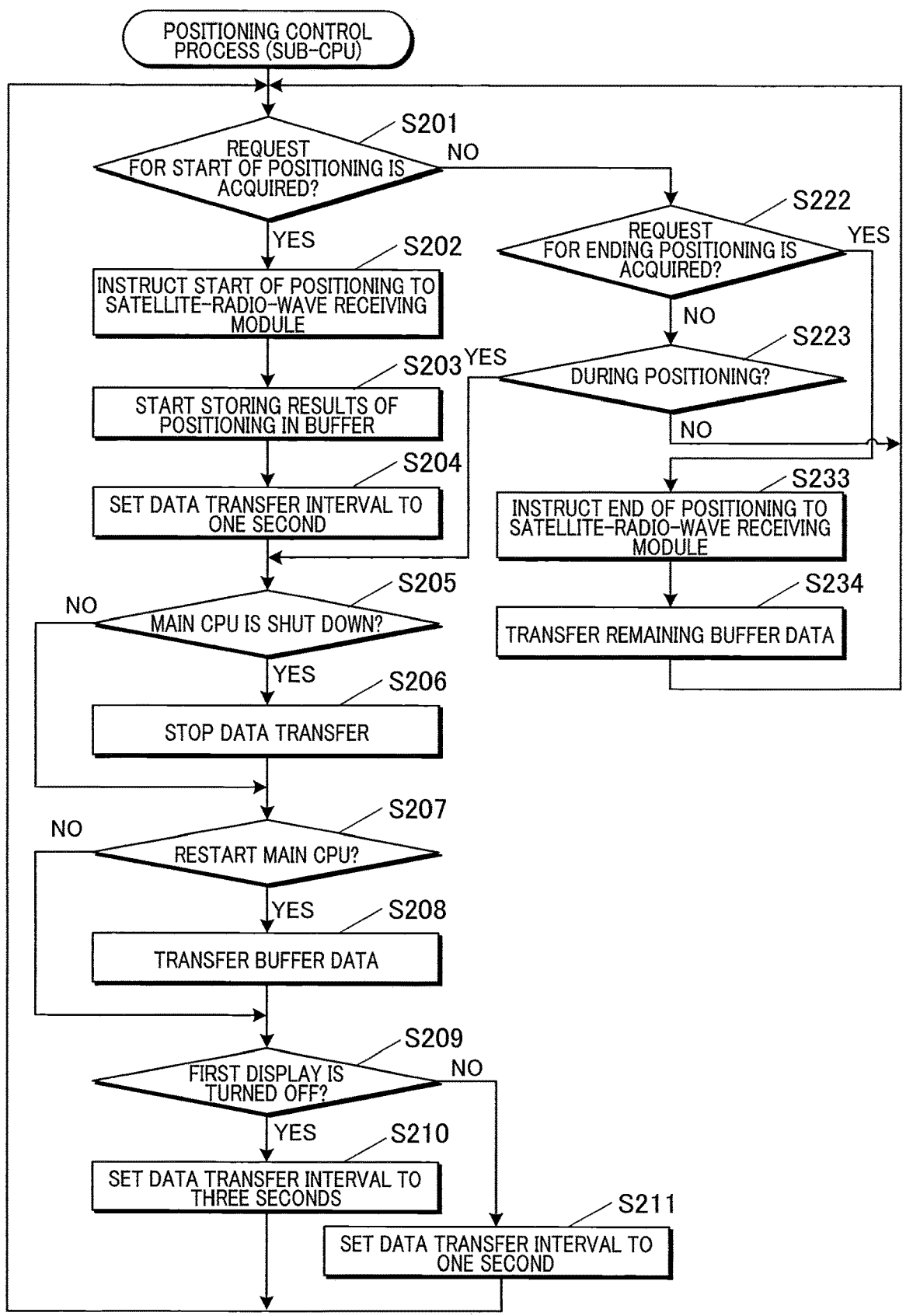
FIG. 7 is a flow chart illustrating a control process for a positioning control process executed by a subsidiary microcomputer.

FIG. 7 is a flow chart illustrating a control process executed by the sub-CPU 211 for a positioning control process executed by the subsidiary microcomputer 21 of the smart watch 100 according to this embodiment. The positioning control process is constantly carried out after the start-up of the subsidiary microcomputer 21 in a normal state.

After start of the positioning control process, the sub-CPU 211 determines whether the subsidiary microcomputer 21 has received a request for starting positioning from the main microcomputer 11 (main CPU 111) (step S201). If the subsidiary microcomputer 21 has received the request ("YES" in step S201), the sub-CPU 211 sends an instruction for start of positioning to the satellite-radio-wave receiving module 24 (step S202). The sub-CPU 211 starts a process of sequentially storing the results of the positioning from the satellite-radio-wave receiving module 24 in the buffer memory 215 (step S203) (temporary storage step, temporarily storage means). The sub-CPU 211 sets a first time interval to one second for transferring the results of the positioning stored in the buffer memory 215 to the main microcomputer 11. In specific, the results of the positioning acquired at an interval of one second are transferred to the main microcomputer 11 at substantially real time (step S204).

The sub-CPU 211 determines whether the main CPU 111 is shut down or whether the main microcomputer 11 enters the dormant mode (standby mode) (step S205). If the main CPU 111 is shut down ("YES" in step S205), the sub-CPU 211 stops the transfer of the results of the positioning to the main microcomputer 11 (step S206). The process then goes to step S207. If the main CPU 111 is not shut down (if the operation of the main CPU 111 continues or if the main CPU 111 is already shut down) ("NO" in step S205), the process goes to step S207.

In the step S207, the sub-CPU 211 determines whether the main CPU 111 is restarted or the main microcomputer 11 is in an operational state (step S207). If the main CPU 111 is restarted ("YES" in step S207), the sub-CPU 211 transfers the data on the results of the positioning (buffer data) accumulated in the buffer memory 215 to the main microcomputer 11 (step S208). The process then goes to step S209. If the main CPU 111 is not restarted (if the main CPU 111 is in an operational mode or continues to be in the dormant mode) ("NO" in step S207), the process goes to step S209.

In step S209, the sub-CPU 211 checks for the "OFF" state of the display operation of the first display 12 (step S209). If the display operation of the first display 12 is turned off ("YES" in step S209), the sub-CPU 211 sets a second time interval to three seconds (which is longer than the first time interval) for the data transfer on the results of the positioning to the main microcomputer 11 (step S210). The process then goes to step S201. If the first display 12 is not turned off, i.e., turned on ("NO" in step S209), the sub-CPU 211 sets a time interval to one second for transferring the data on the results of the positioning to the main microcomputer 11 (step S211). The process then goes to step S201.

In step S201, if no request for starting positioning is received by the subsidiary microcomputer 21 ("NO" in step S201), the sub-CPU 211 determines whether the subsidiary microcomputer 21 has received a request for ending positioning (step S222). If the request for ending positioning is received by the subsidiary microcomputer 21 ("YES" in step S222), the sub-CPU 211 sends an instruction for ending the positioning to the satellite-radio-wave receiving module 24 (step S233). The sub-CPU 211 transfers all data items on the results of the positioning remaining in the buffer memory 215 to the main microcomputer 11 (step S234). The process then goes to step S201.

In step S222, if no request for ending positioning is received ("NO" in step S222), the sub-CPU 211 determines whether positioning is currently being carried out (step S223). If positioning is currently being carried out ("YES" in step S223), the process goes to step S205. If positioning is not currently being carried out ("NO" in step S223), the process goes to step S201.

Steps S204 to S211 correspond to the step of data transfer and the data transferring means in the method of processing information and the program according to this embodiment.

Figure 8:
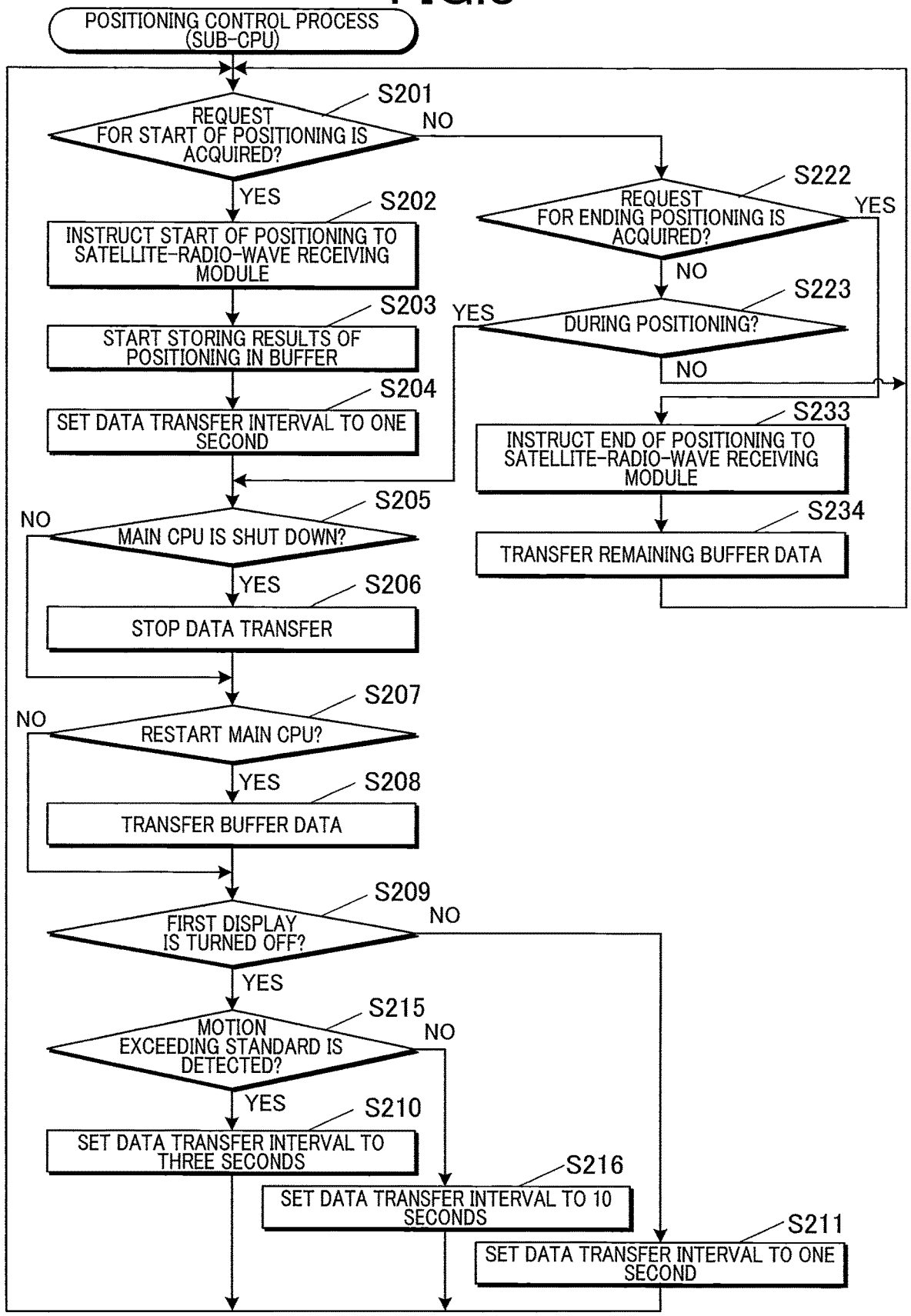
FIG. 8 is a flow chart illustrating a modification of the positioning control process.

FIG. 8 is a flow chart illustrating a modification of the positioning control process executed by the subsidiary microcomputer 21 of the smart watch 100 according to this embodiment.

The positioning control process according to this modification is identical to the positioning control process according to the embodiment described above, except that the process according to the modification further includes step S215 and S216. The steps corresponding to the same processes are indicated by the same reference signs, without redundant descriptions.

In the positioning control process according to this modification, the frequency or time interval of transferring the result of the positioning to the main microcomputer 11 is modified on the basis of the results of the measurements of the kinetic state of the smart watch 100 by the measuring unit 23.

In step S209, if the display operation of the first display 12 is turned off ("YES" in step S209), the sub-CPU 211 acquires observed values of the kinetic state from the measuring unit 23 and checks for detection of motion equal to or exceeding a predetermined standard (step S215). If such motion is detected ("YES" in step S215), the sub-CPU 211 sets the interval to three seconds for transfer of the results of the positioning to the main microcomputer 11 (step S210). The process then goes to step S201. If such motion is not detected ("NO" in step S215), the sub-CPU 211 sets the interval to 10 seconds for transfer of the results of the positioning to the main microcomputer 11 (step S216). The process then goes to step S201.

Figure 9:
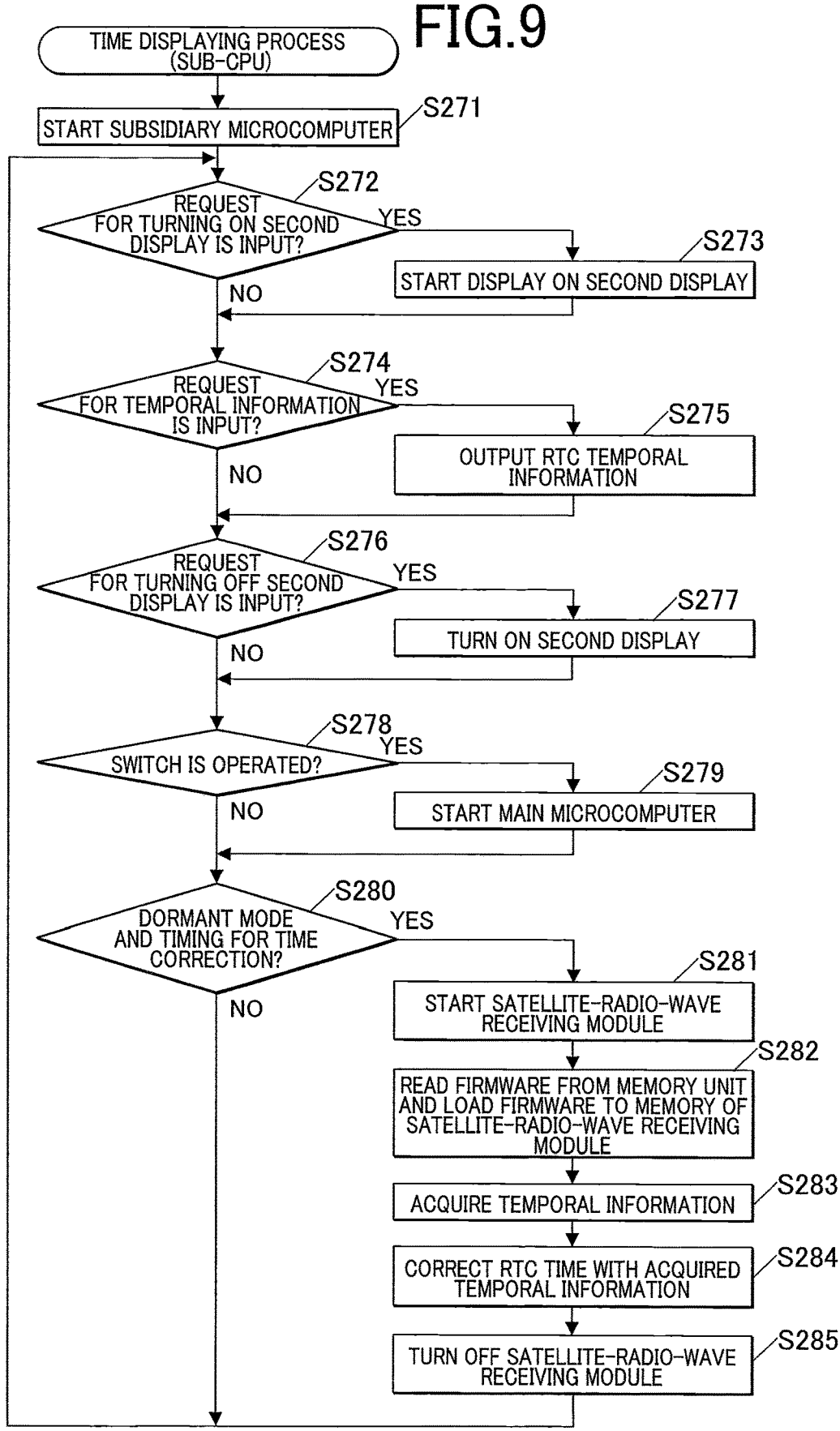
FIG. 9 is a flow chart illustrating a time displaying process.

The time displaying process executed by the sub-CPU 211 of the subsidiary microcomputer 21 of the smart watch 100 will now be explained with reference to FIG. 9. The time displaying process is executed by the subsidiary microcomputer 21 to display and correct time. In the smart watch 100, for example, turning on the power triggers the sub-CPU 211 to execute the time displaying process in cooperation with a time displaying program read from the memory 213 and appropriately deployed to the RAM 212. The subsidiary microcomputer 21 of the smart watch 100 according to this embodiment does not shut down after start-up unless the power is disconnected or the battery runs out.

The sub-CPU 211 carries out the start-up process of the subsidiary microcomputer 21 (step S271). The sub-CPU 211 checks for input of a request for turning on the second display 22 from the main CPU 111 (step S272). If the request is input ("YES" in step S272), the sub-CPU 211 instructs the second display 22 to display the time counted by the RTC 214 (step S273). In step S273, the time displayed on the display screen 22a as illustrated in FIG. 1B is updated every second on the basis of the time counted by the RTC 214.

If the request is not input ("NO" in step S272) or after step S273, the sub-CPU 211 checks for input of a request for information on the time counted by the RTC 214 from the main CPU 111 (step S274). If the request for information on time is input ("YES" in step S274), the sub-CPU 211 acquires the current temporal information from the RTC 214 and sends it to the main CPU 111 (step S275).

If the request for information on time is not input ("NO" in step S274) or after step S275, the sub-CPU 211 checks for input of a request for turning off the second display 22 by the main CPU 111 (step S276). If the request for turning off the second display 22 is input ("YES" in step S276), the sub-CPU 211 turns off the display operation of the second display 22 such that the second display 22 becomes transparent (step S277).

If the request for turning off the second display 22 is not input ("NO" in step S276) or after step S277, the sub-CPU 211 determines whether the switch 25 is pressed (step S278). If the switch 25 is pressed ("YES" in step S278), the sub-CPU 211 starts the main microcomputer 11 (step S279).

If the switch 25 is not pressed ("NO" in step S278) or after step S279, the sub-CPU 211 determines whether the main microcomputer 11 is in the dormant mode (the first display 12 is turned off) and whether it is the timing to correct the current time, in reference to the current time counted by the RTC 214 (step S280). For example, the subsidiary microcomputer 21 acquires temporal information from the satellite-radio-wave receiving module 24 at a predetermined time interval, for example, once a day, and corrects the time. The timing of correcting time in step S280 is a predetermined amount of time after the previous correction of the time.

If the main microcomputer 11 is not in the dormant mode or if it is not the timing of correcting the time ("NO" in step S280), the process goes to step S272. If the main microcomputer 11 is in the dormant mode and if it is the timing of correcting the time ("YES" in step S280), the sub-CPU 211 starts the satellite-radio-wave receiving module 24 (step S281). The sub-CPU 211 reads firmware for the operation of the satellite-radio-wave receiving module 24 from the memory 213, transfers the firmware to the satellite-radio-wave receiving module 24, and loads the firmware to the memory 241 (step S282). After the firmware is loaded to the memory 241, the satellite-radio-wave receiving module 24 can receive radio waves from the GNSS satellites, acquire the temporal information, and generate positioning information, under the control of the firmware loaded to the memory 241.

The sub-CPU 211 acquires the current temporal information from the satellite-radio-wave receiving module 24 (step S283). The GNSS satellites are provided with clocks having high precision. The radio waves from the GNSS satellites contain information on the time counted by these clocks. In other words, the information on the time from the satellite-radio-wave receiving module 24 has a precision higher than that of the time counted by the RTC 214.

The sub-CPU 211 corrects the time of the RTC 214 with reference to the temporal information acquired in step S283 (step S284). The sub-CPU 211 turns off the satellite-radio-wave receiving module 24 (step S285). The process then goes to step S272.

As described above, the smart watch 100 includes a main microcomputer 11, a subsidiary microcomputer 21 that consumes reduced amounts of power compared to the main microcomputer 11 during operation, and a satellite-radio-wave receiving module 24 that receives radio waves from positioning satellites and converting the radio waves into positional information. The operation of the satellite-radio-wave receiving module 24 is controlled by the subsidiary microcomputer 21. The subsidiary microcomputer 21 temporarily stores the positioning data acquired by the satellite-radio-wave receiving module 24 in the buffer memory 215 and transfers the positioning data temporarily stored in the buffer memory 215 to the main microcomputer 11 at a predetermined timing determined in accordance with the operating conditions of the main microcomputer 11.

In this way, the subsidiary microcomputer 21 can maintain and control a constant positioning operation by the satellite-radio-wave receiving module 24 while consuming a reduced amount of power, to acquire data. The acquired data can be transferred to the main microcomputer 11 that carries out the actual data processing at an appropriate timing in accordance with the operating conditions of the main microcomputer 11. This can reduce the power consumption during operations other than those consuming increased amounts of power, such as information processing and display operations. Thus, the positioning operation can be controlled more efficiently.

The main microcomputer 11 can switch between the operational mode and the dormant mode (standby mode). In the dormant mode, the subsidiary microcomputer 21 stores positioning data in the buffer memory 215 and transfers the stored positioning data to the main microcomputer 11 after the main microcomputer 11 enters the operational mode.

The main microcomputer 11 is in the dormant mode while no particular processing is carried out other than positioning, and the results of the positioning are temporarily stored in the subsidiary microcomputer 21. Thus, the power consumption of the main microcomputer 11 can be significantly reduced, and the results of the positioning can be certainly acquired under such reduced power consumption.

In the dormant mode, the main microcomputer 11 temporarily enters the operational mode at a predetermined maintenance operation interval and carries out predetermined processing. The subsidiary microcomputer 21 transfers the positioning data while the main microcomputer 11 is in the operational mode.

In this way, the results of the positioning are transferred to the main microcomputer 11 in accordance with the intermittent operation of the main microcomputer 11 required for maintenance of the operation of the smart watch 100. Thus, the operation of the main microcomputer 11 is not restarted at an unnecessarily high frequency. Moreover, a large buffer memory 215 is not required in anticipation of delayed transfer of the results, and data can be transferred in a short time because long-term accumulation of data is prevented. Thus, operational efficiency can be enhanced without a reduction in usability for users.

The smart watch 100 includes a first display 12. While the first display 12 displays images under the control of the main microcomputer 11, the subsidiary microcomputer 21 transfers the positioning data to the main microcomputer 11 at a first time interval of one second. While the first display 12 displays no images under the control of the main microcomputer 11, the subsidiary microcomputer 21 transfers the positioning data to the main microcomputer 11 at a second time interval of three seconds, which is longer than the first time interval.

The main microcomputer 11 is not urged to process the results of the positioning at real time while the results of the positioning are not displayed. Thus, multiple data items can be transferred in batches at a longer interval to increase the operational efficiency without a reduction in usability for users.

The first display 12 does not display images while the main microcomputer 11 is in the dormant mode. This enables ready checking for display on the results of the positioning. The first display 12, which displays various images, can be turned off together with the sophisticated main microcomputer 11 to achieve the stable operation of the subsidiary microcomputer 21 and a reduction in power consumption.

The smart watch 100 includes an external memory 15 that stores map data. The main microcomputer 11 generates image data for displaying a map including at least the recent current position P determined on the basis of the positioning data and at least the recent current position P on the map, in reference to the positioning data and the map data.

The main microcomputer 11 generates images of the current position and the trajectory as needed, with reference to the map data independently provided. In the smart watch 100, the sophisticated main microcomputer 11 intermittently operates to carry out such image generation for a sufficient term, and the subsidiary microcomputer 21, which consumes a reduced amount of power, acquires the results of the positioning. This disperses the load and enhances the processing efficiency. When map generation and display are not required, the main microcomputer 11 can be shut down to readily reduce the power consumption.

The main microcomputer 11 causes the map including at least the recent current position P to appear on the first display 12, based on the image data generated for display.

Similarly, the sophisticated main microcomputer 11 of the smart watch 100 controls the display of the map and can readily display a high-resolution map the user can readily view when necessary. If such display is not necessary, the subsidiary microcomputer 21 may solely control the positioning operation to significantly reduce the power consumption of the main microcomputer 11.

The main microcomputer 11 causes a map and a mark indicating the recent current position P disposed at a fixed position to appear on the first display 12.

As described above, the smart watch 100 sequentially updates at real time images having the current position P disposed at the center appearing on the first display 12 under the control of the main microcomputer 11, based on the results of the positioning, if the display of the images is required. This enhances usability for the users.

The main microcomputer 11 causes at least the recent current position P to be overlapped or not on the map.

The current position can appropriately appear or disappear under the control of the main microcomputer 11. This allows the main microcomputer 11 to carry out processing that has a load greater than that of mere control of the positioning operation. Thus, necessary information can be appropriately provided to the user without an excessive increase in the power consumption of the main microcomputer 11.

The smart watch 100 includes a measuring unit 23 that measures the kinetic state of the smart watch 100. The subsidiary microcomputer 21 modifies the second time interval on the basis of the results of measurements by the measuring unit 23.

The positioning operation by such an information processing apparatus is usually carried out while the user carrying the information processing apparatus is moving. While the user is not moving, the need is low for the acquisition, processing, and display of the recent current position at real time. Thus, the processing frequency can be reduced by increasing the interval of data transfer while the user is not moving, to increase the power efficiency without reducing usability for the user. A prompt detection of the kinetic state relative to the operation of the first display 12 enables ready acquisition of data immediately before the actual display of the data. This enhances usability for the user. The arm motion of the user is detected before the smart watch 100 reaches a specific orientation that is detected by the tilt sensor. Thus, transmission and processing of the results of the positioning can start slightly before the user views the smart watch 100.

According to this embodiment, the smart watch 100 includes a clock 114 that counts time (time and date, or at least a value related to time); an RTC 214 that counts time with a precision lower than that of the clock 114; a satellite-radio-wave receiving module 24 that receives radio waves from positioning satellites and acquires temporal information having a precision higher than that of the RTC 214; and a sub-CPU 211 that controls the satellite-radio-wave receiving module 24. The sub-CPU 211 acquires temporal information from the satellite-radio-wave receiving module 24 and corrects the time of the RTC 214, in reference to the temporal information. Thus, the time to be displayed can be appropriately acquired from either the clock 114 or the RTC 214, and the precision of time counted by the RTC 214 can be increased.

The smart watch 100 further includes a main microcomputer 11, and a subsidiary microcomputer 21 that operates by consuming an amount of power smaller than that of the main microcomputer 11. The clock 114 is provided in the main microcomputer 11, and the RTC 214 is provided in the subsidiary microcomputer 21. Thus, the precision of time counting can be increased while the subsidiary microcomputer 21 is operating in a state of low power consumption.

The embodiment described above includes a main microcomputer 11; a subsidiary microcomputer 21 consumes reduced amounts of power compared to the main microcomputer 11 during operation; and a satellite-radio-wave receiving module 24 that receives radio waves from positioning satellites converting the radio waves into positional information. The satellite-radio-wave receiving module 24 operates under the control of the subsidiary microcomputer 21 that carries out a method of processing information in an information processing apparatus or smart watch 100 controlled by the subsidiary microcomputer 21. The method involves temporarily storing positioning data sent from the satellite-radio-wave receiving module 24; and transferring the temporarily stored positioning data to the main microcomputer 11 at a predetermined timing determined in accordance with the operating conditions of the main microcomputer 11.

In this way, a constant positioning operation is maintained and controlled by the subsidiary microcomputer 21 operating with low power consumption, and data can be promptly transferred to the main microcomputer 11 at an appropriate timing only when the processing and display of the results of the positioning are required. This further enhances the efficiency of the control operations involved in the positioning operation.

The programs 213a according to this embodiment causes the subsidiary microcomputer 21 of the smart watch 100 to function as a temporary storage means that temporarily stores the positioning data acquired by the satellite-radio-wave receiving module 24, and a data transfer means that transfers the temporarily stored positioning data to the main microcomputer 11 at a predetermined timing in accordance with the operating conditions of the main microcomputer 11.

The smart watch 100 includes the main microcomputer 11 and the subsidiary microcomputer 21, as described above. The subsidiary microcomputer 21, which has low power consumption, maintains the acquisition of the results of the positioning under the control of software and transfers the data to the sophisticated main microcomputer 11 in accordance with the use of the results of the positioning, to increase the processing rate of the main microcomputer 11. This can enhance the efficiency of control operations involved in the positioning operation.

The present invention should not be limited to the embodiments described above and may include various modifications.

For example, in the embodiments described above, the operating conditions of the main microcomputer 11 are controlled with reference to the operational/dormant mode, the on/off state of the display operation of the first display 12, the on/off state of display of a position by the positional-information acquisition application program during the display operation, and the on/off state of concurrent operation of other application programs by the main microcomputer 11. Alternatively, the control may be carried out in consideration of any other factor. For example, the control may be based on the usage rate of the main CPU 111 and/or the size of the free memory in the RAM 112, instead of individual operations.

In addition to adjustment of the interval of the operational state, the main microcomputer 11 may be controlled to execute the high-load processing during periods other than the high-load periods that may occur due to processing of other application programs.

In the embodiment described above, the first display 12 displays a map. The first display 12 may also display tables of numeric values of the traveling distance and time, for example. These values and the map may be simultaneously displayed.

In the embodiment described above, the subsidiary microcomputer 21 transfers the accumulated results of the positioning in a batch after the main microcomputer 11 resumes operation from the dormant mode. Alternatively, a predetermined volume of data may be transferred at a predetermined interval after resumption of the main microcomputer 11.

In the embodiment described above, the results of the positioning stored in the buffer memory 215 are transferred in response to the temporal restart of the main microcomputer 11 every 10 minutes. In the case of no periodical restart, the subsidiary microcomputer 21 may cause the main microcomputer 11 to periodically operate for transfer of the results of the positioning such that the results of the positioning do not exceed the capacity of buffer memory 215.

In the embodiment described above, the transfer interval of the results of the positioning is varied based on only the on/off state of the first display 12. Alternatively, the transfer interval may be varied based on any other condition, for example, the on/off state of real-time display of the results of the positioning or the update frequency of the results of the positioning that is determined in response to an input operation. In the embodiment described above, the transfer interval of the results of the positioning are one or three seconds. This is a mere example, and the transfer interval may be determined on any other condition, for example, the precision of the positioning. The precision of the positioning may be varied in response to an input operation by the user. The transfer interval may also vary in accordance with the variation in the precision of the positioning.

In the embodiment described above, the map data is retrieved from the external memory 15. Alternatively, the map data may be retrieved from an external server via the wireless communication controller 14. The map data may have any format. The main microcomputer 11 (main CPU 111) converts the format of the map data to a format displayable on the screen, for example, pixmap data. In the embodiment described above, the on/off state of the display of the current position is switched. Alternatively, the current position may be constantly displayed on the map during the positioning by an application program, if required by the specification of the application program.

In the embodiment described above, the subsidiary microcomputer 21 controls the measuring unit 23 to vary the transfer interval of the results of the positioning on the basis of the results of the measurement by the measuring unit 23. Alternatively, the main microcomputer 11 may control the measuring unit 23 and notify the subsidiary microcomputer 21 of the results of the measurement and the transfer interval determined in accordance with the results of the measurement.

In the embodiment described above, the kinetic state of the smart watch 100 is measured by the measuring unit 23 while the first display 12 is turned off, and the transfer interval is expanded if a motion equal to or exceeding a predetermined standard is undetected. Alternatively, the kinetic state of the smart watch 100 may be measured by the measuring unit 23 while the first display 12 is turned on, and the transfer interval may be narrowed if a motion equal to or exceeding a predetermined standard is detected.

As described above, the computer readable medium storing the programs 213*a* for the positioning control process involved in the processing carried out by the sub-CPU 211 according to the present invention is exemplified by the memory 213 including a non-volatile memory. Alternatively, any computer readable medium may be used. Examples of other computer readable media include portable recording media, such as a hard disk drive (HDD), a CD-ROM, and a DVD disk. Carrier waves may also be applied to the present invention as a medium that provides data of the program according to the present invention via a communication line.

The detailed configuration and structure of the components of the embodiments described above may be appropriately modified without departing from the scope of the present invention.

The embodiments described above should not be construed to limit the present invention, and the claims and other equivalents thereof are included in the scope of the invention.

The invention claimed is:

1. An information processing apparatus comprising:
a first processor;
a second processor which consumes less power than the first processor during an operation; and
a positioning processor which receives radio waves from positioning satellites and converts the radio waves into positioning data,
wherein:
the second processor controls the positioning processor,
the second processor includes a temporary storage,
the second processor obtains at a first time interval positioning data converted by the positioning processor,
the second processor temporarily stores, in the temporary storage, the positioning data converted by the positioning processor,
the second processor transfers the positioning data stored in the temporary storage to the first processor at a timing determined in accordance with an operating condition of the first processor,
the first processor transmits a positioning end request signal to the second processor, and
after obtaining the positioning end request signal, the second processor transmits a signal to end positioning to the positioning processor, and transmits to the first processor data which is not yet transmitted among the positioning data stored in the temporary storage.

2. An information processing apparatus comprising:
a first processor;
a second processor which consumes less power than the first processor during an operation;
a positioning processor which receives radio waves from positioning satellites and converts the radio waves into positioning data;
a map-information storage which stores map data; and
a display,
wherein:
the second processor controls the positioning processor,
the second processor includes a temporary storage,
the second processor obtains at a first time interval positioning data converted by the positioning processor, the second processor temporarily stores, in the temporary storage, the positioning data converted by the positioning processor, the second processor transfers to the first processor the positioning data stored in the temporary storage at a timing determined in accordance with an operating condition of the first processor, the first processor uses the positioning data and the map data to generate image data for displaying a map of a range including at least a recent position determined based on the positioning data and for displaying at least the recent position on the map, based on the image data generated for display, the first processor controls the display to display the map of the range including at least the recent position, and the first processor controls the display to switch between showing and not showing at least the recent position overlapped on the display of the map.

3. A method for an information processing apparatus that includes a first processor, a second processor which consumes less power than the first processor during an operation, and a positioning processor which receives radio waves from positioning satellites and converts the radio waves into positioning data, wherein the second processor controls the positioning processor, and the second processor includes a temporary storage, the method comprising:

obtaining, by the second processor at a first time interval, positioning data converted by the positioning processor;

by the second processor, temporarily storing in the temporary storage the positioning data converted by the positioning processor;

by the second processor, transferring the positioning data stored in the temporary storage to the first processor at a timing determined in accordance with an operating condition of the first processor;

by the first processor, transmitting a positioning end request signal to the second processor; and by the second processor, after obtaining the positioning end request signal, transmitting a signal to end positioning to the positioning processor, and transmitting to the first processor data which is not yet transmitted among the positioning data stored in the temporary storage.

4. A method for an information processing apparatus that includes a first processor, a second processor which consumes less power than the first processor during an operation, a positioning processor which receives radio waves from positioning satellites and converts the radio waves into positioning data, a map-information storage which stores map data, and a display, wherein the second processor controls the positioning processor, and the second processor includes a temporary storage, the method comprising:

obtaining, by the second processor at a first time interval, positioning data converted by the positioning processor;

by the second processor, temporarily storing in the temporary storage the positioning data converted by the positioning processor;

by the second processor, transferring the positioning data stored in the temporary storage to the first processor at a timing determined in accordance with an operating condition of the first processor;

by the first processor, using the positioning data and the map data to generate image data for displaying a map of a range including at least a recent position determined based on the positioning data and for displaying at least the recent position on the map;

by the first processor, based on the image data generated for display, controlling the display to display the map of the range including at least the recent position; and by the first processor, controlling the display to switch between showing and not showing at least the recent position overlapped on the display of the map.

\* \* \* \* \*